United States Patent
Xu et al.

(10) Patent No.: US 10,384,428 B2
(45) Date of Patent: Aug. 20, 2019

(54) POLYURETHANE ROLL COVER FOR CALENDER ROLL FOR PAPERMAKING MACHINE

(71) Applicant: Stowe Woodward Licensco, LLC, Raleigh, NC (US)

(72) Inventors: Jun Xu, Frederick, MD (US); Christopher Hill, Strasburg, VA (US); Christopher Tyson, Clear Brook, VA (US); Charles Hunter, Winchester, VA (US)

(73) Assignee: Stowe Woodward Licensco LLC, Youngsville, NC (US)

( * ) Notice: Subject to any disclaimer, the term of this patent is extended or adjusted under 35 U.S.C. 154(b) by 0 days.

(21) Appl. No.: 15/349,259

(22) Filed: Nov. 11, 2016

(65) Prior Publication Data

US 2017/0137998 A1 May 18, 2017

Related U.S. Application Data

(60) Provisional application No. 62/256,312, filed on Nov. 17, 2015.

(51) Int. Cl.
*D21G 1/02* (2006.01)
*B32B 27/40* (2006.01)
*B32B 5/02* (2006.01)

(52) U.S. Cl.
CPC .............. *B32B 27/40* (2013.01); *B32B 5/02* (2013.01); *D21G 1/0233* (2013.01)

(58) Field of Classification Search
CPC ...... D21G 1/02; D21G 1/0233; D21G 1/0246; D21F 1/60

USPC .............................................. 492/48, 53, 56
See application file for complete search history.

(56) References Cited

U.S. PATENT DOCUMENTS

| | | | | |
|---|---|---|---|---|
| 4,324,177 A | * | 4/1982 | Tsuji | D21G 1/0233 100/155 R |
| 4,368,568 A | * | 1/1983 | Watanabe | B29D 99/0035 492/52 |
| 4,962,578 A | * | 10/1990 | Saito | D21G 1/0233 428/906 |

(Continued)

FOREIGN PATENT DOCUMENTS

| | | |
|---|---|---|
| CN | 102757720 | 10/2012 |
| JP | 2002521579 | 7/2002 |
| JP | 6173190 | 8/2017 |
| WO | 03/056195 | 10/2003 |
| WO | 2010/003460 | 1/2010 |

OTHER PUBLICATIONS

International Search Report and Written Opinion for PCT/US2016/059815 dated Feb. 16, 2017, 17 pages.

(Continued)

*Primary Examiner* — James P Mackey
(74) *Attorney, Agent, or Firm* — Myers Bigel, P.A.

(57) ABSTRACT

A calender roll for a papermaking machine includes: a substantially cylindrical core; and a cover circumferentially surrounding the core. The cover comprises a base layer circumferentially overlying the core; and a topstock layer comprising polyurethane circumferentially overlying the base layer, the topstock layer being fiber reinforced, the polyurethane having a glass transition temperature of between about 120 and 150° C., the topstock layer having a hardness of 70 to 90 ShD.

15 Claims, 1 Drawing Sheet

(56) References Cited

U.S. PATENT DOCUMENTS

| | | | |
|---|---|---|---|
| 5,895,689 A * | 4/1999 | Gajewski | C08G 18/10 |
| | | | 427/385.5 |
| 6,375,602 B1 | 4/2002 | Jones | |
| 6,409,645 B1 | 6/2002 | Paasonen et al. | |
| 8,647,475 B2 * | 2/2014 | Turunen | D21F 3/08 |
| | | | 156/169 |
| 2007/0111871 A1 | 5/2007 | Butterfield et al. | |
| 2010/0132904 A1 * | 6/2010 | Ajoviita | D21G 1/0233 |
| | | | 162/358.3 |
| 2010/0190624 A1 | 7/2010 | Wokurek et al. | |
| 2013/0312926 A1 | 11/2013 | Shieh | |
| 2015/0090133 A1 * | 4/2015 | Grohmann | D21F 3/08 |
| | | | 100/163 A |

OTHER PUBLICATIONS

Internationai Preliminary Report on Patentability corresponding to International Application No. PCT/US2016/059815 dated May 31, 2018.
Examination Report corresponding to Australian Application No. 2016357211 dated Nov. 1, 2018.
Office Action corresponding to Japanese Application No. 2018-519687 dated Feb. 19, 2019.
Extended European Search Report corresponding to European Application No. 16866842.4 dated Apr. 12, 2019.
Office Action corresponding to Chinese Application No. 201680048973.X dated Apr. 24, 2019.

* cited by examiner

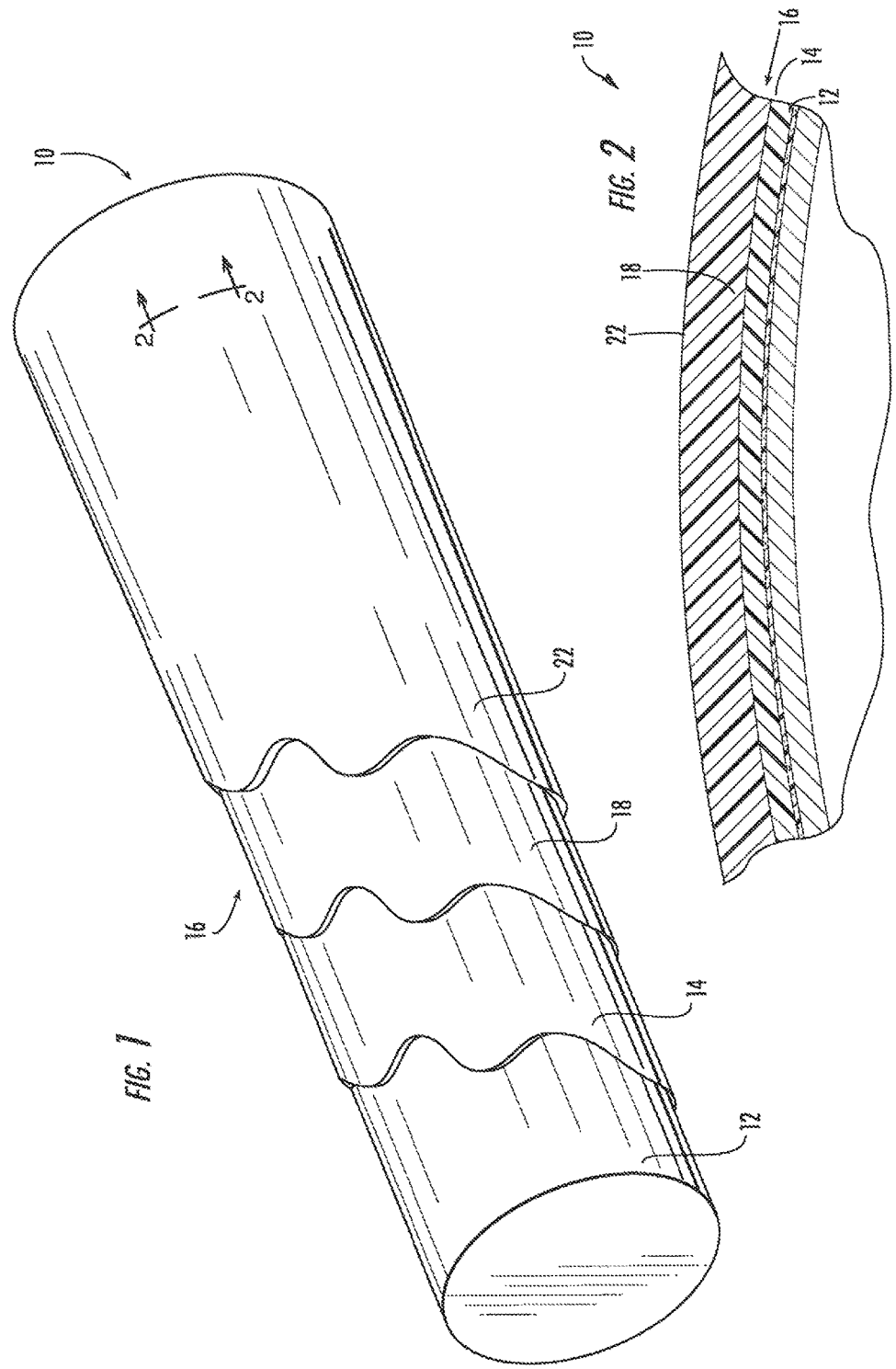

POLYURETHANE ROLL COVER FOR CALENDER ROLL FOR PAPERMAKING MACHINE

RELATED APPLICATION

The present application claims priority from and the benefit of U.S. Provisional Patent Application No. 62/256,312, filed Nov. 17, 2015, the disclosure of which is hereby incorporated herein in its entirety.

FIELD OF THE INVENTION

The present invention relates generally to covers for industrial rolls, and more particularly to polyurethane covers for industrial rolls.

BACKGROUND OF THE INVENTION

In a typical papermaking process, a water slurry, or suspension, of cellulosic fibers (known as the paper "stock") is fed onto the top of the upper run of an endless belt of woven are and/or synthetic material that travels between two or more rolls. The belt, often referred to as a "thrilling fabric," provides a papermaking surface on the upper surface of its upper run which operates as a filter to separate the cellulosic fibers of the paper stock from the aqueous medium, thereby forming a wet paper web. The aqueous medium drains through mesh openings of the forming fabric, known as drainage holes, by gravity or vacuum located on the lower surface of the upper run (i.e., the "machine side") of the fabric.

After leaving the forming section, the paper web is transferred to a press section of the paper machine, where it is passed though the nips of one or more presses (often roller presses) covered with another fabric, typically referred to as a "press felt." Pressure from the presses removes additional moisture from the web; the moisture removal is often enhanced by the presence of a "batt" layer of the press felt. The paper is then transferred to a dryer section for further moisture removal. After drying, the paper is ready for secondary processing (often in a calender section of the papermaking machine) and packaging.

Cylindrical rolls are typically utilized in different sections of a papermaking machine. Such rolls reside and operate in demanding environments in which they can be exposed to high dynamic loads and temperatures and aggressive or corrosive chemical agents. As an example, in a typical paper mill, rolls are used not only for transporting the fibrous web sheet between, processing stations, but also, in the case of press section and calender rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a typically metallic core. By varying the material employed in the cover, the cover designer can provide the roll with different performance characteristics as the papermaking application demands. Also, repairing, regrinding or replacing a cover over a metallic roll can be considerably less expensive than the replacement of an entire metallic roll. Exemplary polymeric materials for covers include natural rubber, synthetic rubbers such as neoprene, styrene-butadiene (SBR), nitrile rubber, chlorosulfonated polyethylene ("CSPE"—also known under the trade name HYPALON® from DuPont), EDPM (the name given to an ethylene-propylene terpolymer formed of ethylene-propylene diene monomer), polyurethane, thermoset composites, and thermoplastic composites.

In many instances, the roll cover will include at least two distinct layers: a base layer that overlies the core and provides a bond thereto; and a topstock layer that overlies and bonds to the base layer and serves as the outer surface of the roll (some rolls will also include an intermediate "tie-in" layer sandwiched by the base and top stock layers). The layers for these materials are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. Also, in order to be economical, the cover should be abrasion- and wear-resistant.

Calender rolls, which are typically employed in a calender section located downstream of the dryer section of the papermaking machine, are employed to finish the paper to a desired smoothness and finish. Calender rolls are typically required to have a high modulus of elasticity (i.e., rigidity), abrasion resistance, toughness, glass transition temperature (Tg) and barring resistance. Typical compounds for calendar roll covers are epoxies, given their high modulus and Tg, but these compounds often lack toughness. As such, alternative materials for use in calender applications may be desirable.

SUMMARY

As a first aspect, embodiments of the invention are directed to a calender roll for papermaking machine comprising: a substantially cylindrical core; and a cover circumferentially surrounding the core. The cover comprises: a base layer circumferentially overlying the core; and a topstock layer comprising polyurethane circumferentially overlying the base layer, the topstock layer being fiber-reinforced, the polyurethane having a glass transition temperature of between about 120 and 150° C., the topstock layer having a hardness of 70 to 90 ShD.

As a second aspect, embodiments of the invention are directed to a calender roll for a papermaking machine comprising: a substantially cylindrical core; and a cover circumferentially surrounding the core. The cover comprises: a base layer circumferentially overlying the core; and a topstock layer comprising polyurethane circumferentially overlying the base layer, the topstock layer being fiber-reinforced, the polyurethane having a strain at failure of between about 7 and 12 percent, the topstock layer having a hardness of 70 to 90 ShD.

As a third aspect, embodiments of the invention are directed to a calender roll for a papermaking machine comprising: a substantially cylindrical core; and a cover circumferentially surrounding the core. The cover comprises: a base layer circumferentially overlying the core; and a topstock layer comprising polyurethane circumferentially overlying the base layer, the topstock layer being fiber-reinforced, wherein the polyurethane is prepared from a mixture comprising an isocyanate, a catalyst and a hardener, and wherein the isocyanate is included at a weight percent of between about 70 and 85 percent, and the catalyst is included at a weight percent of between about 10 and 20 percent; the polyurethane having a glass transition temperature of between about 120 and 150° C. and a strain at failure of between about 7 and 12 percent, the topstock layer having a hardness of 70 to 90 ShD.

BRIEF DESCRIPTION OF THE FIGURES

FIG. 1 is a perspective cutaway view of an industrial roll according to embodiments of the present invention.

FIG. 2 is a greatly enlarged, partial section view of the roll of FIG. 1 taken along lines 2-2 thereof.

DETAILED DESCRIPTION OF EMBODIMENTS OF THE INVENTION

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity. Well-known functions or constructions may not be described in detail for brevity and/or clarity.

In addition, spatially relative terms, such as "under", "below", "lower" "over", "upper" and the like, may be used herein for ease of description to describe one element or features relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. As used herein, the term "and/or" includes any and all combinations of one or more of the associated listed items. Where used, the terms "attached," "connected," "interconnected," "contacting," "coupled," "mounted," "overlying" and the like can mean either direct or indirect attachment or contact between elements, unless stated otherwise.

The term "about," as used herein when referring to a measurable value, such as an amount or concentration, encompasses variations of the specified measurable value as well as the specified value, and may encompass variations of ±10%, ±5%, ±1%, ±0.5%, ±0.1%, or the like. For example, "about X" where X is the measurable value, is meant to include X as well as variations of X that may include ±10%, ±5%, ±1%, ±0.5%, ±0.1%, or the like. A range provided herein for a measurable value may include any other range and/or individual value therein.

Referring now to the figures, a calender roll, designated broadly at 10, is illustrated in FIGS. 1 and 2. The roll 10 includes in overlying relationship a core 12 (typically metallic), an adhesive layer 14, and a cover 16. Each of these components is discussed in greater detail herein below.

The core 12 is a substantially cylindrical, hollow structure typically formed of steel, some, other metal, or even a composite material. The core 12 is typically between about 1.5 and 400 inches, in length and about 1 and 70 inches in diameter, with lengths between about 100 and 400 inches and diameters of between about 20 and 70 inches being common for papermaking purposes. At these more common length and diameter ranges, the core 12 typically has walls between about 1 and 5 inches in thickness. Components such as journals and bearings (not shown) are typically included on the core 12 to facilitate its mounting, and rotation in a papermaking machine. The surface of the core 12 may be treated by blasting, sanding, sandblasting, or the like to prepare the surface for bonding to the adhesive, layer 14.

Referring again to FIGS. 1 and 2, the adhesive layer 14 comprises an adhesive (typically an epoxy adhesive) that can attach the core 12 to the cover 16. Of course, the adhesive comprising the adhesive layer 14 should be chosen to be compatible with the materials of the core 12 and the base layer 18 of the cover 16 (i.e., it should provide a high-integrity bond between these structures without unduly harming either material); preferably, the bond has a tensile bond strength of between about 1,200 and 5,000 psi. The adhesive may have additives, such as curing agents, that facilitate curing and physical properties. Exemplary adhesives include Chendok 220X and Chemlok 205, which are epoxy adhesives available from Lord Corporation, Raleigh, N.C.

The adhesive layer 14 can be applied to the core 12 in any manner known to be suitable to those skilled in this art for applying a thin 21 layer of material. Exemplary application techniques include spraying, brushing, immersion, scraping, and the like. It is preferred that, if a solvent-based adhesive is used, the adhesive layer 14 be applied, such that the solvent can evaporate prior to the application of the cover 16 in order to reduce the occurrence of trapped solvent that can cause "blows" during the curing process. Those skilled in this art will appreciate that the adhesive layer 14 may comprise multiple coats of adhesive, which may comprise different adhesives; for example, two different epoxy adhesives with slightly different properties may be employed, it should also be noted that, in some embodiments, the adhesive layer may be omitted entirely, such that the cover 16 is bonded directly to the core 12.

Still referring to FIGS. 1 and 2, the cover 16 comprises, in overlying relationship, a base layer 18 and a topstock layer 22. In the illustrated embodiment, the base layer 18 is adhered to the adhesive layer 14. The base layer 18 comprises a polymeric compound (typically a thermoset-based composite, such as epoxy) that typically includes fillers and other additives.

Fillers are typically added to the base layer 18 to modify the physical properties of the polymeric compound and/or to reduce its cost. Exemplary filler materials include, but are not limited to, inorganic oxides such as aluminum oxide ($Al_2O_3$), silicon dioxide ($SiO_2$), magnesium oxide (MgO), calcium oxide (CaO), zinc oxide (ZnO) and titanium dioxide ($TiO_2$); carbon black (also known as furnace black); silicates such as clays, talc, wollastonite ($CaSiO3$), magnesium silicate $MgSiO_3$), anhydrous aluminum silicate, and feldspar (KAlSi$_3$O$_8$); sulfates such as barium sulfate and calcium sulfate; metallic powders such as aluminum, iron, copper, stainless steel, and nickel, carbonates such as calcium carbonate (CaCo$_3$) and magnesium carbonate (MgCo$_3$); mica; silica (natural, fumed, hydrated, anhydrous or precipitated); and nitrides and carbides, such as silicon carbide (SiC) and aluminum nitride (AlN). These fillers may be present in virtually any form, such as powder, pellet, fiber or sphere.

Also, the base layer 18 may optionally include other additives, such as polymerization initiators, activators and accelerators, curing or vulcanizing agents, plasticizers, heat stabilizers, antioxidants and antiozonants, coupling agents, pigments, and the like, that can facilitate processing and enhance physical properties. These components are generally compounded into the polymer prior to the time of application of the base layer 18 to the adhesive layer 14 or directly to the core 12. Those skilled in this art will appreciate that, the identity and amounts of these agents and their use in a base layer are generally known and need not be described in detail herein.

The base layer 18 can be applied by any manner known to those skilled in this art to be suitable for the application of polymers to an underlying, surface. The thickness of the base layer 18 is typically between about 0.0625 inches and about 1 inch, in some embodiments between about 0.1 inches and about 0.5 inches, and in further embodiments between about 0.1 inches and about 0.25 inches. Those skilled in this art will appreciate that, in some embodiments, the base layer 18 may be omitted such that the topstock layer 22 is adhered directly to the adhesive layer 14 or, in the absence of an adhesive layer, to the core 12.

Referring again to FIGS. 1 and 2, in the illustrated embodiment, the topstock layer 22 circumferentially overlies and, unless one or more tie-in layers are included as described below, is adhered to the base layer 18. The topstock layer 22 comprises a polyurethane compound that has a high Tg and is reinforced with fiber, as is described in greater detail below.

Polyurethanes are formed when diol chain extenders are used, as polyalkylmethylene ether glycols and alcohols bond to isocyanates to form urethane linkages. Any isocyanate useful in preparing polyurethanes from polyether glycols, isocyanates and diols can be used in this invention. They include, but are not limited to, 2,4-toluene diisocyanate, 2,6-toluene diisocyanate ("TDI"), 4,4'-diphenylmethane diisocyanate or ("MDI"), 4,4'-dicyclohexylnietharie diisocyanate ("H$_{12}$ MDI"3,3'-dimethyl-4,4'-biphenyl diisocyanate ("TODI"), 1,4-benzene diisocyanate, trans-cyclohexane-1, 4-diisocyanate, 1,5-naphthalene diisoeyanate ("NDI"), 1,6-hexamethylene diisocyanate ("HDI"), 4,6-xylylene diisocyanate, isophorone diisocyanate ("IPDI"), and combinations thereof. The invention also provides aliphatic, cycloaliphatic, and aromatic polyisocyanates e.g., the alkylene diisocyanates and the aryl diisocyanates. MDI and are preferable for use in the present invention.

Macroglycols useful in the preparation of the urethane nanocomposite products of the invention can have a number average molecular weight (MW) of at least 250, e.g., polyethers, polyester macroglycols, and the like. The number average molecular weight of the macroglycol can be as high as, e g., about 10,000 or as low as about 250.

A preferred high MW macroglycol is, a polyalkylene ether macroglycol having a general formula HO(RO)$_n$H, wherein R is an alkylene moiety and n is an integer large enough that the polyether macroglycol has a number average molecular weight of at least about 250. Such polyalkylene ether macroglycols are well known and can be prepared by the polymerization of cyclic ethers, such as alkylene oxides and glycols, dihydroxyethers, and the like, employing methods known in the art.

Another preferred high MW macroglycol is a polyester macroglycol. Polyester macroglycols can be prepared, by reacting dibasic, acids (usually adipic acid, but other components, such as sebacic or phthalic acid, may be present) with dials such as ethylene glycol; 1,2-propylene glycol; 1,3 propanediol, 1,4 butanediol; diethylene glycol; tetramethylene ether glycol, and the like. Another useful polyester macroglycol can be obtained by the addition polymerization of ε-caprolactone in the presence of an initiator.

Other useful macroglycols include polycarbonates, which are commercially available from Bayer (Leverkusen, Germany), and macroglycols that have two hydroxyl groups and whose backbone is obtained by polymerization or copolymerization of such monomers as butadiene and isoprene. Particularly preferred macroglycols useful in the invention can include dihydroxypolyesters, poly tetramethylene ether glycols (PTMEG), and the polycarbonates.

A "curative" or "hardener" is a compound or mixture of compounds, such as a curative blend, that link long molecules together and thereby complete a polymer reaction. A curative can also be a "chain-extender" in the context of the present invention. In polyurethane systems, the curative is comprised of hydroxyl (or amine)-terminated compounds that react with isocyanate groups present in the mixture. Examples of dial curatives or chain extenders can be ethylene glycol, 1,2-propylene glycol, 1,3-propanediol, 1,4-butanediol, 1,6-hexanediol, diethylene glycol, 2-methyl-1,3-propanediol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis(hydroxyethoxy)benzene, bis (hydroxyethylene)terephthalate, hydroquinone bis(2-hydroxyethyl) ether (HQEE), and combinations thereof. Examples of diamine curatives or chain extenders include, but are not limited to, 1,2-ethylenediamine, 1,6-hexanediamine, 1,2-propanediamine, 4,4'-methylene-bis(3-chloroaniline) (also known as 3,3'-dichloro-4,4'-diaminodiphenylmethane) ("MOCA" or "Mboca"), dimethylthiotoluenediamine ("DMTDA"), 4,4'-diaminodiphenylmethane ("DDM"), 1,3-diaminobenzene, 1,4-diaminobenzene, 3,3'-dimethoxy-4,4'-diamino biphenyl, 3,3'-dimethyl-4,4'-diamino biphenyl, 4,4'-diamino biphenyl, 3,3'-dichloro-4,4'-diamine biphenyl, and combinations thereof.

Curatives also useful in the present invention include, but are not limited to, 4,4'-methylene-bis(2-chloroaniline) (MBCA); 4,4'-methylene-bis(3-chloro-2,6-diethylaniline) (MCDEA); diethyl toluene diamine (DETDA); tertiary butyl toluene diamine (TBTDA); dimethylthio-toluenediamine; trimethylene glycol di-p-amino-benzoate; methylenedianiline (MDA); methylenedianiline-sodium chloride complex (Caytur® 21 and 31 from Uniroyal Chemical Company, Inc). In a preferred embodiment, a blend of diol and amine curatives is used.

Catalysts are not necessary to prepare the polyurethanes or polyurethane ureas, but may provide advantages in their manufacture. The catalysts most widely used are tertiary amines and organo-tin compounds, and they can be used in the one-shot process, in making prepolymers, and in making polyurethanes or polyurethane ureas from prepolymers.

The polyurethane compound of the topstock layer 22 is typically formed of and prepared from an isocyanate (such as methylene diphenyl diisocyante (MDI)), a polyol catalyst (such as polytetramethylene ether glycol), and a hardener (such as 4,4'-Methylenebis(3-Chloro-2,6-Diethylaniline)). In some embodiments, the weight percent of isocyanate is between about 70 and 85 percent, the weight percent of catalyst is between about 10 and 20 percent, and the weight percent of hardener is between about 2 and 10 percent. In one embodiment, the polyurethane comprises a compound having the properties listed in Table 1 when molded as a neat resin.

TABLE 1

| Property | Units | ASTM Test Method | Value |
|---|---|---|---|
| Tensile Modulus | GPa | D-638 | 2.6-3.3 |
| Tensile Break Strength | MPa | | 60-100 |
| Strain at Failure | % | | 7-12 |
| Water Absorption (24 Hr Immersion) | Wt % | D-570 | 0.3-0.4 |
| Water Absorption (24 H, 80° C., 95% RH) | Wt % | HPU Spec. | 1.0-1.5 |
| Hardness | Shore D | D-2240 | 70-90 |
| Specific Gravity | | D-792 | 1.23 |
| Tg by DMA E' Onset | ° C. | D-7028 | 120-150 |
| Tg by DMA tan δ peak | ° C. | | 130-160 |

An exemplary polyurethane compound is EXP 393/394/395, provided by Huntsman Polyurethanes (The Woodlands, Tex.). The compound has an isocyanate/catalyst/hardener ratio of approximately 80/15/5 percent by weight. The physical properties of this compound are listed below in Table 2.

TABLE 2

| Property | Units | ASTM Test Method | Value |
|---|---|---|---|
| Tensile Modulus | GPa | D-638 | 2.85 |
| Tensile Break Strength | MPa | | 84.5 |
| Strain at Failure | % | | 10.8 |
| Water Absorption (24 Hr Immersion) | Wt % | D-570 | 0.33 |
| Water Absorption (24 H, 80° C., 95% RH) | Wt % | HPU Spec. | 1.25 |
| Hardness | Shore D | D-2240 | 81 |
| Specific Gravity | | D-792 | 1.23 |
| Tg by DMA E' Onset | ° C. | D-7028 | 135 |
| Tg by DMA tan δ peak | ° C. | | 144 |

The polyurethane compound of the topstock layer 22 is typically reinforced with reinforcing fiber. The reinforcing fiber may be glass fiber, carbon fiber, polyester, nylon, aramid, or combinations of these materials. The reinforcing fiber may be in numerous forms, including a filament or tape, and may be woven or nonwoven.

Typically the topstock layer 22 includes fillers and other additives. Exemplary fillers include, but are not limited to, clay and other inorganic fillers such as silicone dioxide, carbon, black, clay, and, titanium dioxide ($TiO_2$) as well as others set forth hereinabove in connection with the base layer 18. Other exemplary fillers include carbon fiber, carbon nanotubes, graphene, and metal oxides or carbides. Typically, fillers are included in an amount of between about 3 and 70 percent by weight of the topstock layer 22. The fillers can take virtually any form, including powder, pellet, bead, fiber, sphere, particle, nanoparticle, or the like. Fillers may be included to enhance properties such as abrasion resistance, thermal expansion coefficient, thermal conductivity, electrical conductivity and dielectric constant. In one embodiment, a filler such as clay may be added in a weight percent of between and 30 and 60 parts per hundred parts of polyurethane.

Exemplary additives include, but are not limited to, polymerization, initiators, activators and accelerators, curing or vulcanizing agents, plasticizers, heat stabilizers, antioxidants, coupling agents, pigments, and the like, that can facilitate processing and enhance physical properties. Those skilled in this art will understand the types and concentrations of additives that are appropriate for inclusion in the topstock layer 22, so these need not be discussed in detail herein.

An exemplary formulation for the topstock, layer 22 may include the components listed in Table 3.

TABLE 3

| Component | Parts |
|---|---|
| Polyurethane | 100 |
| Fillers | |
| Wollastonite | 50 |
| Silicon Carbide | 20 |

The topstock layer 22 can be applied over the base layer 18 by any technique known to those skilled in this art to be suitable for the application of elastomeric materials over a cylindrical surface, including casting, extrusion, dip pan, resin transfer molding (RTM), vacuum-assisted resin transfer molding (VARTM), reaction injection molding (RIM), vacuum infusion, and pultrusion.

In some embodiments, the topstock layer 22 is applied such that it is between about 0.25 inches and about 2.5 inches in thickness (at higher thickness, multiple passes of material may be required), in some embodiments, the topstock layer 22 has a thickness between about 0.5 inches and about 1.5 inches and in some embodiments between about 1 inch and about 1.5 inches. It is also suitable for the thickness of the top stock layer 22 be between about 50 and 90 percent of the total cover thickness (i.e., the total thickness of the combined base and topstock layers 18, 22).

The compounds of the base layer 18 and the topstock 22 may be selected such that the base layer 18 has a higher hardness value than the topstock layer 22. As an example, the base layer 18 may have a hardness of between about 80 and 95 ShD (in some embodiments, between about 80 and 90 ShD, and in other embodiments, between about 80 and 85 ShD), and the top stock layer 22 may have a hardness of between, about 70 and 90 ShD (in some embodiments between about 75 and 85 ShD)). The graduated, hardness concept can reduce the bond line shear stresses that can occur due to mismatches of the elastic properties (such as elastic modulus and Poisson's ratio) of the various layers in the cover constructions. This reduction in interface shear stress can, be important in maintaining cover integrity.

Those skilled in this art, will also appreciate that the roll 10 may be constructed with a tie-in layer sandwiched between the base layer 18 and the topstock layer 22, such that the tie-in layer would directly underlie the top stock layer 22. The typical properties of a tie-in layer are well-known to those skilled in this art and need not be described in detail herein.

Use of the aforementioned polyurethane compounds in the topstock layer 22 can provide a number of advantages. Polyurethane compounds can provide greater toughness and/or damage tolerance than the epoxy compounds typically employed. Curing time is reduced compared to epoxy. The resin viscosity of polyurethane is typically lower than that of epoxy, which can assist in, filler dispersion and enables higher filler loading and can improve processing consistency and speed.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A calender roll for a papermaking machine, comprising:
   a substantially cylindrical core; and
   a cover circumferentially surrounding the core, the cover comprising:
   a base layer circumferentially overlying the core; and
   a topstock layer comprising polyurethane circumferentially overlying the base layer, the topstock layer being fiber-reinforced, the polyurethane having a glass transition temperature of between about 120 and 150° C., the topstock layer having a hardness of 70 to 90 ShD, wherein the polyurethane is prepared from a mixture comprising an isocyanate, a catalyst and a hardener; and wherein the isocyanate is included at a weight percent of between about 70 and 85 percent, and the catalyst is included at a weight percent of between about 10 and 20 percent.

2. The calender roll defined in claim 1, wherein the polyurethane has a strain at failure of at least 7 percent.

3. The calender roll defined in claim 1, wherein the isocyanate comprises MDI.

4. The calender roll defined in claim 1, wherein the topstock layer is reinforced with fiber selected from the group consisting of: glass, carbon, polyester, nylon, aramid, and combinations thereof.

5. The calender roll defined in claim 4, wherein the fiber comprises a filament or tape.

6. The calender roll defined in claim 1, in combination with a papermaking machine, wherein the calender roll is mounted in a calender section of the papermaking machine.

7. A calender roll for a papermaking machine, comprising:
   a substantially cylindrical core; and
   a cover circumferentially surrounding the core, the cover comprising:
   a base layer circumferentially overlying the core; and
   topstock layer comprising polyurethane circumferentially overlying the base layer, the topstock layer being fiber-reinforced, the polyurethane having a strain at failure of between about 7 and 12 percent, the topstock layer having a hardness of 70 to 90 ShD, wherein the polyurethane is prepared from a mixture comprising an isocyanate, a catalyst and a hardener; and wherein the isocyanate is included at a weight percent of between about 70 and 85 percent, and the catalyst is included at a weight percent of between about 10 and 20 percent.

8. The calender roll defined in claim 7, wherein the isocyanate comprises MDI.

9. The calender roll defined in claim 7, wherein the topstock layer is reinforced with fiber selected from the group consisting of glass, carbon, polyester, nylon, aramid, and combinations thereof.

10. The calender roll defined in claim 9, wherein the fiber comprises a filament or tape.

11. The calender roll defined in claim 7, in combination with a papermaking machine, wherein the calender roll is mounted in a calender section of the papermaking machine.

12. A calender roll for a papermaking machine, comprising:
    a substantially cylindrical core; and
    a cover circumferentially surrounding the core, the cover comprising:
    a base layer circumferentially overlying the core; and
    a topstock layer comprising polyurethane circumferentially overlying the base layer, the topstock layer being fiber-reinforced, wherein the polyurethane is prepared from a mixture comprising an isocyanate, a catalyst and a hardener, and wherein the isocyanate is included at a weight percent of between about 70 and 85 percent, and the catalyst is included at a weight percent of between about 10 and 20 percent; the polyurethane having, a glass transition temperature of between about 120 and 150° C. and a strain at failure of between about 7 and 12 percent, the topstock layer having a hardness of 70 to 90 ShD.

13. The calender roll defined in claim 12, wherein the topstock layer is reinforced with fiber selected from the group consisting of glass, carbon, polyester, nylon, aramid, and combinations thereof.

14. The calender roll defined in claim 13, wherein the fiber comprises a filament or tape.

15. The calender roll defined in claim 12, in combination with a papermaking machine, wherein the calender roll is mounted in a calender section of the papermaking machine.

* * * * *

UNITED STATES PATENT AND TRADEMARK OFFICE
CERTIFICATE OF CORRECTION

PATENT NO. : 10,384,428 B2
APPLICATION NO. : 15/349259
DATED : August 20, 2019
INVENTOR(S) : Xu et al.

It is certified that error appears in the above-identified patent and that said Letters Patent is hereby corrected as shown below:

In the Specification

Column 5, Line 47:
Please correct "("$H_{12}$ MDI"3,3'" to read -- ("$H_{12}$MDI"), 3,3' --

Column 5, Line 54:
Please correct "and are" to read -- and TDI are --

In the Claims

Column 10, Line 12, Claim 9:
Please correct "of glass" to read -- of: glass --

Column 10, Line 41, Claim 13:
Please correct "of glass" to read -- of: glass --

Signed and Sealed this
Third Day of December, 2019

Andrei Iancu
*Director of the United States Patent and Trademark Office*